(12) United States Patent
Hatanaka et al.

(10) Patent No.: US 10,079,108 B2
(45) Date of Patent: Sep. 18, 2018

(54) MULTILAYER CAPACITOR AND MOUNTING STRUCTURE

(71) Applicant: KYOCERA Corporation, Kyoto-shi, Kyoto (JP)

(72) Inventors: Hidefumi Hatanaka, Kirishima (JP); Katsuichi Kato, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/533,421

(22) PCT Filed: Dec. 11, 2015

(86) PCT No.: PCT/JP2015/084801
§ 371 (c)(1),
(2) Date: Jun. 6, 2017

(87) PCT Pub. No.: WO2016/098702
PCT Pub. Date: Jun. 23, 2016

(65) Prior Publication Data
US 2017/0330689 A1    Nov. 16, 2017

(30) Foreign Application Priority Data
Dec. 19, 2014    (JP) .................................. 2014-257512

(51) Int. Cl.
*H01G 4/30* (2006.01)
*H01G 4/35* (2006.01)
(Continued)

(52) U.S. Cl.
CPC ............. *H01G 4/306* (2013.01); *H01G 2/065* (2013.01); *H01G 4/008* (2013.01); *H01G 4/12* (2013.01); *H01G 4/232* (2013.01)

(58) Field of Classification Search
CPC ........ H01G 4/306; H01G 2/065; H01G 4/008; H01G 4/12; H01G 4/232; H01G 4/30; H01G 4/35
(Continued)

(56) References Cited

U.S. PATENT DOCUMENTS

2016/0351332 A1* 12/2016 Lee .......................... H01G 4/30

FOREIGN PATENT DOCUMENTS

| JP | 08-330174 A | 12/1996 |
| JP | 11-251177 A | 9/1999 |
| JP | 2012-023322 A | 2/2012 |

OTHER PUBLICATIONS

International Search Report, PCT/JP2015/084801, dated Mar. 1, 2016, 2 pgs.

* cited by examiner

*Primary Examiner* — Michael P McFadden
(74) *Attorney, Agent, or Firm* — Volpe and Koenig, P.C.

(57) ABSTRACT

A multilayer capacitor includes a pair of external electrodes each having an end face portion; a first principal face extending portion; a second principal face extending portion; a first side face extending portion; and a second side face extending portion. The pair of external electrodes each includes a base electrode and a metallic layer. The metallic layer includes a first metallic layer and a second metallic layer located outside the first metallic layer. An intermetallic compound layer is located outside the first metallic layer, and is exposed from the second metallic layer in a ridge portion lying between the end face portion and the first principal face extending portion, a ridge portion lying between the first side face extending portion and the first principal face extending portion, and a ridge portion lying
(Continued)

between the second side face extending portion and the first principal face extending portion.

9 Claims, 5 Drawing Sheets

(51) Int. Cl.
    *H01G 2/06*           (2006.01)
    *H01G 4/232*         (2006.01)
    *H01G 4/008*         (2006.01)
    *H01G 4/12*           (2006.01)

(58) Field of Classification Search
    USPC .................................................... 361/306.3
    See application file for complete search history.

MULTILAYER CAPACITOR AND MOUNTING STRUCTURE

TECHNICAL FIELD

The present invention relates to a multilayer capacitor, and more particularly to a multilayer capacitor comprising a stacked body in which a plurality of dielectric layers and internal electrodes are alternately laminated, and a mounting structure thereof.

BACKGROUND ART

In a multilayer capacitor, dielectric layers and internal electrodes are alternately laminated, and in general, a ferroelectric material having a relatively high dielectric constant, such as barium titanate, is used as a ceramic material which constitutes the dielectric layer. When an AC voltage is applied to such a multilayer capacitor, distortion occurs in the dielectric layer due to an electrostrictive effect of the ceramic material, and the multilayer capacitor in itself vibrates. The vibration of the multilayer capacitor is transmitted to a substrate mounting the multilayer capacitor via solder or other means. Due to the vibration transmitted to the substrate, resonance occurs in the substrate with consequent amplification of the vibration, thus causing vibration sound in the substrate. When the frequency of the vibration in the substrate reaches the audible frequency range, then audible sound is generated from the substrate. That is, a phenomenon of so-called "acoustic noise" occurs. More specifically, in cases where the multilayer capacitor is mounted, at a pair of external electrodes thereof, on the substrate via solder, the substrate becomes deformed due to the vibration of the multilayer capacitor transmitted thereto through the solder adherent to the pair of external electrodes, and consequently vibration sound is generated in the substrate.

To reduce vibration sound in the substrate, use has been made of a multilayer capacitor comprising: a multilayer capacitor main body having a pair of external electrodes disposed one at each of a pair of opposed end faces thereof; and a pair of external terminals each joined to the corresponding one of the pair of external electrodes. In such a multilayer capacitor, the pair of external terminals are joined to the pair of external electrodes, and the multilayer capacitor is mounted on the substrate so that the multilayer capacitor main body is disposed apart from the substrate using the pair of external terminals. This arrangement makes it possible to reduce transmission of vibration generated in the multilayer capacitor main body to the substrate, and thereby restrain vibration sound ascribable to the multilayer capacitor main body from occurring in the substrate. An example of such a multilayer capacitor is disclosed in Patent Literature 1.

CITATION LIST

Patent Literature

Patent Literature 1: Japanese Unexamined Patent Publication JP-A 2012-23322

SUMMARY OF INVENTION

Technical Problem

The above-described multilayer capacitor has succeeded in suppressing "acoustic noise" by reducing transmission of the vibration of the multilayer capacitor main body to the substrate with use of the pair of external terminals that keep the multilayer capacitor main body and the substrate separated. However, the additional placement of the pair of external terminals presents the problem of structural complications in the multilayer capacitor.

The invention has been devised in view of the problem as discussed supra, and an object of the invention is to provide a multilayer capacitor capable of suppressing acoustic noise.

Solution to Problem

A multilayer capacitor in accordance with one embodiment of the invention comprises: a stacked body in which a plurality of dielectric layers are laminated, the stacked body having a form of a rectangular parallelepiped having a pair of principal faces, a pair of end faces, and a pair of side faces; a plurality of internal electrodes which are disposed between the plurality of dielectric layers so as to be spaced from each other in a stacking direction of the plurality of dielectric layers; and a pair of external electrodes which are disposed on the pair of end faces, respectively, and are electrically connected to different internal electrodes of the plurality of internal electrodes, respectively, the pair of external electrodes each comprising an end face portion which covers corresponding one of the pair of end faces; a first principal face extending portion which extends from the end face portion to a first principal face of the pair of principal faces; a second principal face extending portion which extends from the end face portion to a second principal face of the pair of principal faces; a first side face extending portion which extends from the end face portion to a first side face of the pair of side faces; and a second side face extending portion which extends from the end face portion to a second side face of the pair of side faces, each of the pair of external electrodes comprising a base electrode and a metallic layer which covers the base electrode, the metallic layer comprising a first metallic layer covering the base electrode and a second metallic layer located outside the first metallic layer, each of the pair of external electrodes further comprising an intermetallic compound layer which is located outside the first metallic layer, contains a metal which is a same as that contained in the first metallic layer and a metal which is a same as that contained in the second metallic layer, and is exposed from the second metallic layer in a ridge portion lying between the end face portion and the first principal face extending portion, a ridge portion lying between the first side face extending portion and the first principal face extending portion, and a ridge portion lying between the second side face extending portion and the first principal face extending portion.

A mounting structure in accordance with one embodiment of the invention comprises the multilayer capacitor mentioned above; and a substrate having a substrate electrode for mounting of the multilayer capacitor, the multilayer capacitor and the substrate being disposed so that the first principal face extending portion and the substrate electrode are opposed to each other, the first principal face extending portion and the substrate electrode being joined to each other via a conductive joining material.

Advantageous Effects of Invention

In accordance with the multilayer capacitor pursuant to the invention, solder adheres only to the lower surfaces of the pair of external electrodes, wherefore the substrate is less prone to transmission of vibration.

DESCRIPTION OF EMBODIMENTS

Embodiment

Hereinafter, a multilayer capacitor 10 in accordance with an embodiment of the invention will be described with reference to drawings.

Figure 1A:
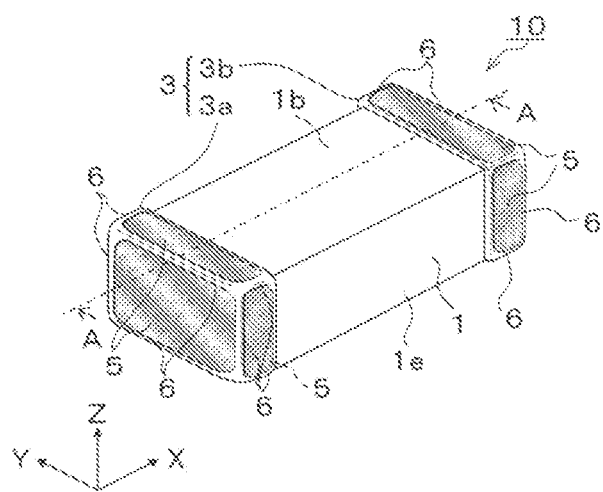
FIG. 1A is a schematic perspective view showing a multilayer capacitor in accordance with an embodiment of the invention.

FIG. 1A is a schematic perspective view showing a multilayer capacitor 10 in accordance with an embodiment of the invention. The multilayer capacitor 10 comprises: dielectric layers made of a ceramic material and internal electrodes 2 (first internal electrodes 2a and second internal electrodes 2b) that are alternately laminated; and a pair of external electrodes (a first external electrode 3a and a second external electrode 3b) electrically connected to the internal electrode 2 extracted to a first end face 1c and the internal electrode 2 extracted to a second end face 1d, respectively. That is, of the internal electrodes 2, the first internal electrode 2a is electrically connected to the first external electrode 3a, and the second internal electrode 2b is electrically connected to the second external electrode 3b. Moreover, for the sake of convenience in explaining the multilayer capacitor 10, an X-Y-Z rectangular coordinate system is defined, and, the term "upper surface" or "lower surface" is used as appropriate under the condition where a positive direction along the Z axis corresponds to an upward direction.

The multilayer capacitor 10 is mounted on a circuit substrate (hereafter referred to as "substrate 9") via solder 7. The substrate 9 is used for, for example, notebook PCs, smartphones, or cellular phones. For example, an electric circuit for electrical connection with the multilayer capacitor 10 is formed on the surface of the substrate 9.

Figure 4A:
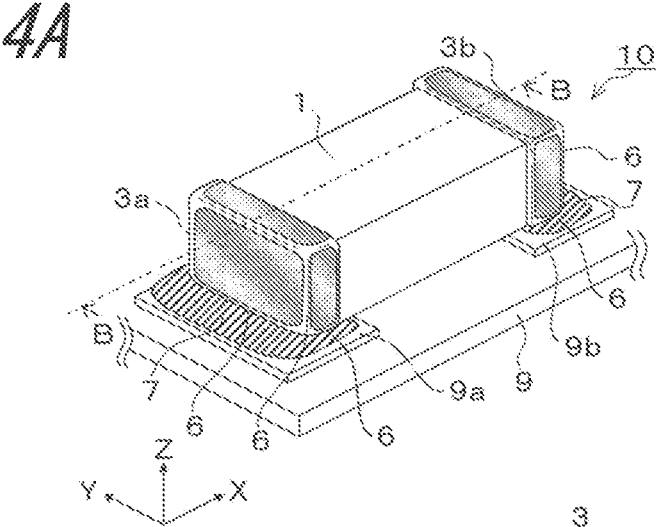
FIG. 4A is a schematic perspective view showing the multilayer capacitor shown in FIGS. 1A and 1B mounted on a substrate.
Figure 4B:
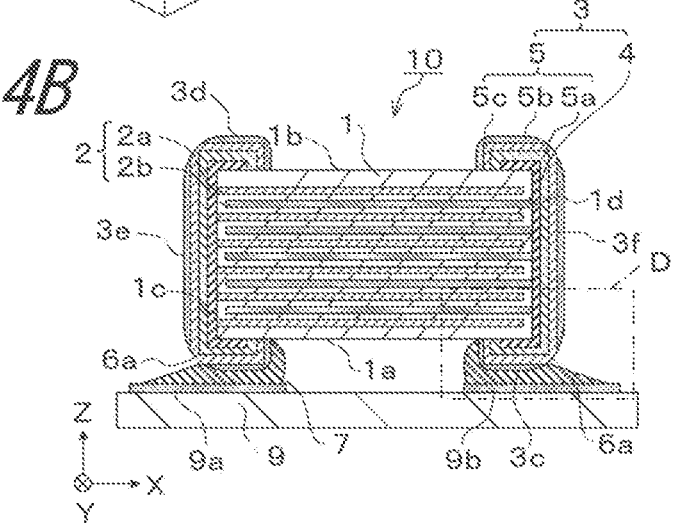
FIG. 4B is a sectional view of the multilayer capacitor mounted on the substrate taken along the line B-B shown in FIG. 4A.
Figure 5:
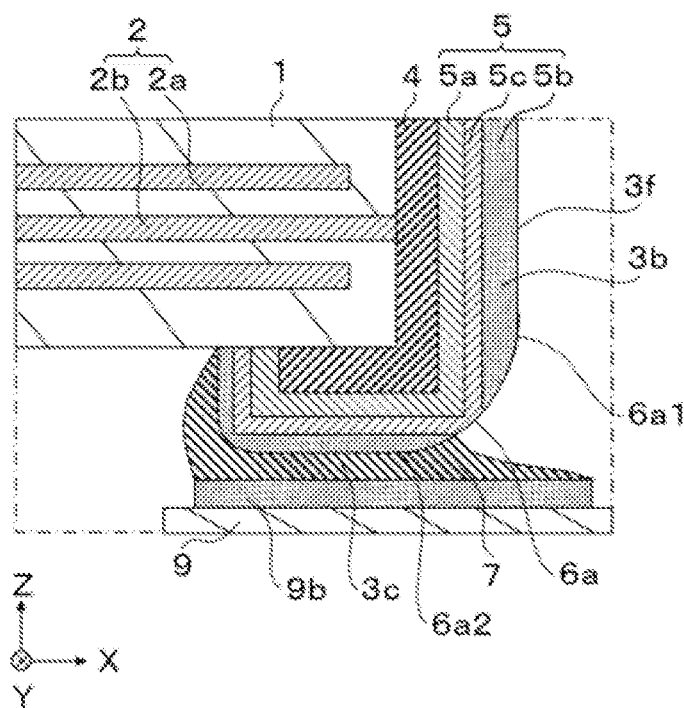
FIG. 5 is an enlarged view of a main part D of the multilayer capacitor shown in FIG. 4B mounted on the substrate.

Moreover, as shown in FIGS. 4A and 4B, for example, the substrate 9 has a substrate electrode 9a and a substrate electrode 9b which are located on a surface thereof on which the multilayer capacitor 10 is mounted, and, a wiring (not shown in the drawing) extends from the substrate electrode 9a, and also a wiring (not shown) extends from the substrate electrode 9b. In the installation of the multilayer capacitor 10, for example, the first external electrode 3a and the substrate electrode 9a are joined to each other via a conductive joining material, and, the second external electrode 3b and the substrate electrode 9b are joined to each other via a conductive joining material. The conductive joining material is solder or conductive resin, for example.

Figure 1B:
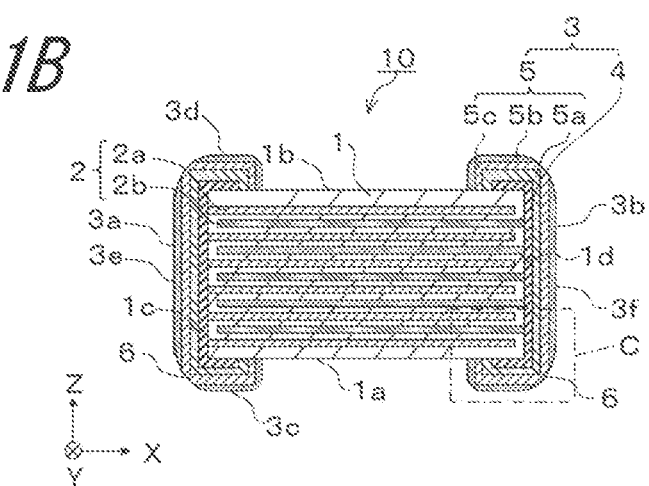
FIG. 1B is a sectional view of the multilayer capacitor shown in FIG. 1A taken along the line A-A.

As shown in FIGS. 1A and 1B, the multilayer capacitor 10 comprises: a stacked body 1; the internal electrodes 2 (the first internal electrodes 2a and the second internal electrodes 2b) disposed within the stacked body 1; and the pair of external electrodes 3 (the first external electrode 3a and the second external electrode 3b) disposed on the first end face 1c and the second end face 1d, respectively, of the stacked body 1 for electrical connection with the internal electrodes 2 extracted to the first end face 1c and the second end face 1d, respectively.

The stacked body 1 is composed of a stack of a plurality of dielectric layers in the form of a rectangular parallelepiped having a pair of principal faces which are opposed to each other (a first principal face 1a and a second principal face 1b), a pair of end faces which are opposed to each other (the first end face 1c and the second end face 1d), and a pair of side faces which are opposed to each other (a first side face 1e and a second side face 1f). The pair of opposed end faces (the first end face 1c and the second end face 1d) provides a connection between the first principal face 1a and the second principal face 1b, and, the pair of opposed side faces (the first side face 1e and the second side face 1f) provides a connection between the first principal face 1a and the second principal face 1b, as well as a connection between the first end face 1c and the second end face 1d. It is noted that the rectangular parallelepiped form is construed as embracing, not only a cubic form or a rectangular parallelepiped form, for example, the form of a rectangular parallelepiped chamfered at ridges thereof to produce rounded ridge portions.

The stacked body 1 in the form of a rectangular parallelepiped composed of a plurality of stacked dielectric layers is of a sintered body obtained by firing a stack of a plurality of ceramic green sheets for forming the dielectric layers. Thus, the stacked body 1 is shaped in a rectangular parallelepiped having a pair of principal faces which are opposed to each other, a pair of end faces which are perpendicular to the paired principal faces and are opposed to each other, and a pair of side faces which are perpendicular to the pair of end faces and are opposed to each other. Moreover, in the stacked body 1, the plane of a section perpendicular to a stacking direction of the dielectric layers (Z-axis direction), namely an XY plane, is rectangular-shaped. Moreover, in the multilayer capacitor 10, the stacked body 1 may be rounded at its ridges.

Thus constructed, the multilayer capacitor 10 has a longitudinal length (length in the Y-axis direction) of, for example, 0.6 (mm) to 2.2 (mm), has a transverse length (length in the X-axis direction) of, for example, 0.3 (mm) to 1.5 (mm), and has a heightwise length (length in the Z-axis direction) of, for example, 0.3 (mm) to 1.2 (mm).

The dielectric layer is rectangular-shaped as seen in a plan view in the stacking direction (Z-axis direction), and has a single-layer thickness of, for example, 0.5 (μm) to 3 (μm). For example, in the stacked body 1, the plurality of dielectric layers in the range of 10 to 1000 (layers) and the internal electrodes 2 are laminated. Moreover, the number of the internal electrode 2 layers disposed within the stacked body 1 is suitably determined in accordance with the characteristics of the multilayer capacitor 10 and so forth.

For example, barium titanate ($BaTiO_3$), calcium titanate ($CaTiO_3$), strontium titanate ($SrTiO_3$), or calcium zirconate ($CaZrO_3$) may be used for the dielectric layer. Moreover, from the standpoint of high dielectric constant, it is particularly desirable to use, as a ferroelectric material having a high dielectric constant, barium titanate for the dielectric layer.

The plurality of internal electrodes 2 include the first internal electrodes 2a and the second internal electrodes 2b. The first internal electrode 2a and the second internal electrode 2b are opposed to each other at predetermined intervals, and more specifically, as shown in FIG. 1B, the first internal electrodes 2a and the second internal electrodes 2b are alternately disposed at predetermined intervals in the stacking direction so as to lie one between the corresponding layers of the plurality of dielectric layers within the stacked body 1 substantially in parallel with the first principal face 1a and the second principal face 1b of the stacked body 1. The first internal electrodes 2a and the second internal electrodes 2b are alternately disposed within the stacked body 1, so that the first internal electrode 2a and the second internal electrode 2b can constitute a pair of internal-electrodes 2.

Thus, the first internal electrode 2a and the second internal electrode 2b are disposed at predetermined intervals in the stacking direction so as to lie one between the corresponding layers of the plurality of dielectric layers within the stacked body 1, that is, the first internal electrode 2a and the second internal electrode 2b are separated by the dielectric layer, and, at least one dielectric layer is interposed between them. The stacked body 1 is obtained by laminating a plurality of dielectric layers provided with the internal electrodes 2.

As shown in FIG. 1B, the first internal electrode 2a is extracted, at one end, to the first end face 1c, and, the second internal electrode 2b is extracted, at one end, to the second end face 1d opposed to the first end face 1c.

Examples of conductive materials used for the first internal electrode 2a and the second internal electrode 2b include a metal material such as nickel (Ni), copper (Cu), silver (Ag), palladium (Pd), or gold (Au), and an alloy material containing one or more of the above-described metal materials, such as a Ag—Pd alloy. Moreover, the first and second internal electrodes 2a and 2b have an electrode thickness of 0.5 (μm) to 2 (μm), for example, and the thickness thereof is suitably determined depending on the intended use. Moreover, the first internal electrode 2a and the second internal electrode 2b are preferably made of the same metal or alloy material.

The pair of external electrodes 3 is placed on the pair of end faces (the first end face 1c and the second end face 1d), respectively, for electrical connection with different internal electrodes 2. That is, the pair of external electrodes is each electrically connected to the internal electrode 2 extracted to the first end face 1c or the second end face 1d. More specifically, the first external electrode 3a is placed on the first end face 1c so as to be electrically connected to the first internal electrode 2a extracted to the first end face 1c, and, the second external electrode 3b is placed on the second end face 1d so as to be electrically connected to the second internal electrode 2b extracted to the second end face 1d.

Moreover, the pair of external electrodes 3 is disposed so as to cover the first end face 1c and the second end face 1d, respectively, and, the first external electrode 3a and the second external electrode 3b are disposed so as to be opposed to each other. As shown in FIGS. 1A and 1B, in the stacked body 1, the pair of external electrodes 3 disposed on the first end face 1c and the second end face 1d, respectively, extends therefrom to a surface point on the first principal face 1a, as well as to a surface point on the second principal face 1b, and also extends to a surface point on the first side face 1e, as well as to a surface point on the second side face 1f.

Thus, as shown in FIG. 1B, the pair of external electrodes 3 is disposed on the surface (the end faces, the principal faces, and the side faces) of the stacked body 1, the pair of external electrodes 3 each having: an end face portion (a first end face portion 3e, a second end face portion 3f) which covers the end face (the first end face 1c, the second end face 1d); a first principal face extending portion 3c which extends from the end face portion to the first principal face 1a of the pair of principal faces; a second principal face extending portion 3d which extends from the end face portion to the second principal face 1b of the pair of principal faces; a first side face extending portion 3g which extends from the end face portion to the first side face 1e of the pair of side faces; and a second side face extending portion 3h which extends from the end face portion to the second side face 1f of the pair of side faces. Moreover, as shown in FIG. 1B, the pair of external electrodes 3 is each composed of a base electrode 4 and a metallic layer 5 which covers the base electrode 4.

The pair of external electrodes 3 has the first end face portion 3e and the second end face portion 3f. The first end face portion 3e covers the first end face 1c, and the second end face portion 3f covers the second end face 1d.

Moreover, the pair of external electrodes 3 has the first principal face extending portion 3c and the second principal face extending portion 3d. The first principal face extending portion 3c extends from the corresponding one of the first end face portion 3e and the second end face portion 3f to the first principal face 1a, and the second principal face extending portion 3d extends from the corresponding one of the first end face portion 3e and the second end face portion 3f to the second principal face 1b.

Moreover, the pair of external electrodes 3 has the first side face extending portion 3g and the second side face extending portion 3h. The first side face extending portion 3g extends from the corresponding one of the first end face portion 3e and the second end face portion 3f to the first side face 1e, and the second side face extending portion 3h extends from the corresponding one of the first end face portion 3e and the second end face portion 3f to the second side face 1f.

The pair of external electrodes 3 includes the base electrode 4 and the metallic layer 5. The base electrode 4 is disposed on the surface (the end faces, the principal faces, and the side faces) of the stacked body 1. That is, the base electrode 4 disposed on the corresponding one of the first end face 1c and the second end face 1d extends therefrom to the first principal face 1a, as well as to the second principal face 1b, and also extend to the first side face 1e, as well as to the second side face 1f. The metallic layer 5 is disposed on the surface of the base electrode 4 so as to cover the base electrode 4.

The base electrode 4 is electrically connected to the internal electrode 2 extracted to the first end face 1c or the second end face 1d. Examples of conductive materials used for the base electrode 4 include a metal material such as copper (Cu), nickel (Ni), silver (Ag), palladium (Pd), or gold (Au), and an alloy material containing one or more of the above-described metal materials, such as a Cu—Ni alloy. Moreover, the pair of base electrodes 4 is preferably formed on the surface of the stacked body 1 and made of the same metal or alloy material.

In the base electrode 4, a part thereof which lies on the first principal face 1a, as well as on the second principal face 1b, has a thickness of, for example, 4 (μm) to 10 (μm), a part thereof which lies on the first end face 1c, as well as on the second end face 1d, has a thickness of, for example, 10 (μm) to 25 (μm), and a part thereof which lies on the first side face 1e, as well as on the second side face 1f, has a thickness of, for example, 4 (μm) to 10 (μm).

As shown in FIG. 1B, the base electrode 4 is disposed on the surface of the stacked body 1, and, the metallic layer 5 is disposed so as to cover the entire base electrode 4. Moreover, as shown in FIG. 1B, the metallic layer 5 includes a first metallic layer 5a and a second metallic layer 5b. The first metallic layer 5a is disposed so as to cover the base electrode 4, and the second metallic layer 5b is located outside the first metallic layer 5a. The metallic layer 5 further includes an intermetallic compound layer 5c which is located outside the first metallic layer 5a, and contains a metal contained in the first metallic layer 5a and a metal contained in the second metallic layer 5b.

As shown in FIGS. 1A and 1B, the intermetallic compound layer 5c is exposed from the second metallic layer 5b in a ridge portion 6a lying between the first end face portion 3e and the first principal face extending portion 3c, a ridge portion 6a lying between the second end face portion 3f and the first principal face extending portion 3c, a ridge portion 6c lying between the first side face extending portion 3g and the first principal face extending portion 3c, and a ridge portion 6c lying between the second side face extending portion 3h and the first principal face extending portion 3c.

Thus, the intermetallic compound layer 5c is disposed between the first metallic layer 5a and the second metallic layer 5b so as to be exposed from the second metallic layer 5b at the ridge portions 6a and the ridge portions 6c. In the multilayer capacitor 10, the intermetallic compound layer 5c is exposed from the second metallic layer 5b at the ridge portions 6.

As shown in FIG. 1B, the first metallic layer 5a is disposed on the surface of the base electrode 4 so as to cover the base electrode 4. The first metallic layer 5a is made of a metal material such for example as nickel (Ni), copper (Cu), gold (Au), silver (Ag), or tin (Sn). The first metallic layer 5a has a thickness of 5 (μm) to 10 (μm), for example.

Moreover, as shown in FIG. 1B, the second metallic layer 5b is disposed outside the first metallic layer 5a. The second metallic layer 5b is made of a metal material such for example as nickel (Ni), copper (Cu), gold (Au), silver (Ag), or tin (Sn). The second metallic layer 5b has a thickness of 5 (μm) to 10 (μm), for example.

In the metallic layer 5, for example, the first metallic layer 5a and the second metallic layer 5b are each a plating layer. For the case where the metallic layer 5 comprises the first metallic layer 5a and the second metallic layer 5b each in the form of a plating layer, for example, the first metallic layer 5a and the second metallic layer 5b may be formed continuously by means of electrolytic plating or otherwise.

For example, in the case of providing the first metallic layer 5a and the second metallic layer 5b each in the form of a plating layer, the plating layer constituting the first metallic layer 5a is disposed so as to cover the base electrode 4, and the plating layer constituting the second metallic layer 5b is disposed on the surface of the plating layer constituting the first metallic layer 5a so as to cover the plating layer constituting the first metallic layer 5a. The first metallic layer 5a and the second metallic layer 5b are each, for example, a nickel (Ni)-plating layer, a copper (Cu)-plating layer, a gold (Au)-plating layer, a silver (Ag)-plating layer, or a tin (Sn)-plating layer. The first metallic layer 5a has a plating thickness of, for example, 5 (μm) to 10 (μm), and, the second metallic layer 5b has a plating thickness of 3 (μm) to 5 (μm), for example. In the multilayer capacitor 10, the first metallic layer 5a is, for example, a nickel (Ni)-plating layer, and the second metallic layer 5b is a tin (Sn)-plating layer, for example.

Moreover, the plating layers are formed for the joining together of the conductive joining material and each of the substrate electrode 9a and the substrate electrode 9b. For example, when using a solder material as the conductive joining material, the plating layers are conducive to easy and secure mounting of the pair of external electrodes 3 on the substrate electrode 9a and the substrate electrode 9b, respectively, of the substrate 9 via the solder 7 by a reflow technique or other means.

Moreover, as shown in FIGS. 1A, 1B and 2A to 2C, in the metallic layer 5, the intermetallic compound layer 5c is located outside the first metallic layer 5a, and is exposed from the second metallic layer 5b at the ridge portions 6. The intermetallic compound layer 5c is designed so that even if molten solder is brought into contact with the intermetallic compound layer 5c during soldering, reactions such as an eutectic reaction with solder is less prone to occur, and the molten solder does not adhere to the surface of the intermetallic compound layer 5c.

In the pair of external electrodes 3, the metallic layer 5 is designed so that the first metallic layer 5a covers the base electrode 4, and the second metallic layer 5b covers the first metallic layer 5a. In forming the metallic layer 5, by subjecting the first metallic layer 5a and the second metallic layer 5b to heat, the intermetallic compound layer 5c is formed between the first metallic layer 5a and the second metallic layer 5b.

More specifically, for example, in cases where the first metallic layer 5a contains nickel (Ni) and the second metallic layer 5b contains tin (Sn), for example, a heating process is effected at temperatures over 230 (° C.), which is the nickel (Ni)-tin (Sn) eutectic temperature, with the maximum temperature adjusted to fall in the range of 250 (° C.) to 260 (° C.). Moreover, time of heating at temperature exceeding 230 (° C.) which is eutectic temperature is set to fall in the range of 60 (sec) to 90 (sec). By effecting the heating process under such heating conditions, it is possible to form the metallic layer 5 in which the intermetallic compound layer 5c is formed between the first metallic layer 5a and the second metallic layer 5b.

In consideration of the precision of exposure of the intermetallic compound layer 5c at each ridge portion 6 and so forth, the intermetallic compound layer 5c is designed to have a thickness of 5 (μm) to 10 (μm), for example. Moreover, the thickness of the intermetallic compound layer 5c may be adjusted by making changes to the time of heating.

The intermetallic compound layer 5c contains a metal contained in the first metallic layer 5a and a metal contained in the second metallic layer 5b. For example, in cases where the first metallic layer 5a contains nickel (Ni) and the second metallic layer 5b contains tin (Sn), the intermetallic compound layer 5c is made of $Ni_3Sn_4$. Moreover, for example, in cases where the first metallic layer 5a contains silver (Ag) and the second metallic layer 5b contains tin (Sn), the intermetallic compound layer 5c is made of $Ag_3Sn$. In addition, for example, in cases where the first metallic layer 5a contains tin (Sn) and the second metallic layer 5b contains gold (Au), the intermetallic compound layer 5c is made of $AuSn_4$. Note that the intermetallic compound layer 5c is not limited to the intermetallic compound layers as described above.

Figure 2A:
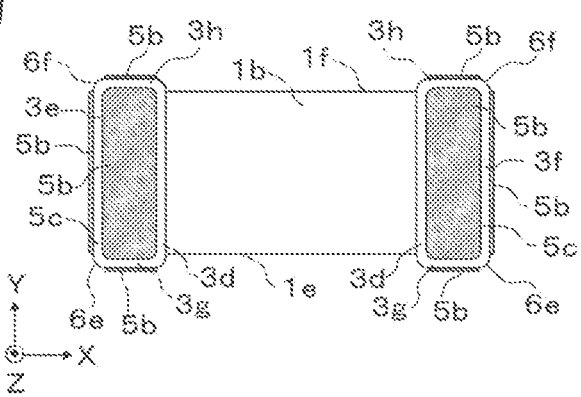
FIGS. 2A to 2C are explanatory views for explaining the range of formation of a metallic layer in a pair of external electrodes.
Figure 2B:
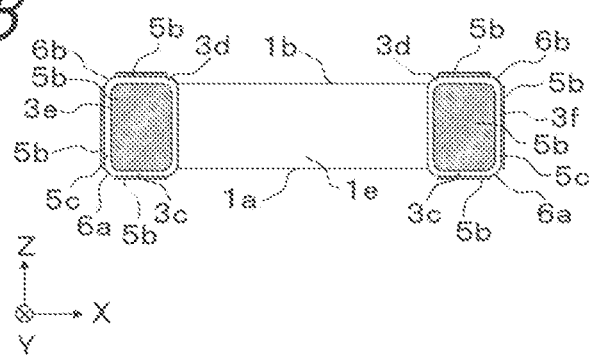
Figure 2C:
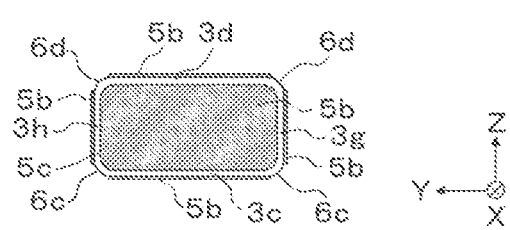

The following describes the range of formation of the second metallic layer 5b and the intermetallic compound layer 5c in the multilayer capacitor 10. The second metallic layer 5b is located on the surface of each of the first principal face extending portion 3c, the second principal face extending portion 3d, the first end face portion 3e, the second end face portion 3f, the first side face extending portion 3g, and the second side face extending portion 3h. FIGS. 2A to 2C are explanatory views for explaining the range of formation of the second metallic layer 5b, and more specifically, FIG. 2A is a view of the multilayer capacitor 10 as seen in a direction perpendicular to the X-Y plane (Z-axis direction), FIG. 2B is a view of the multilayer capacitor 10 as seen in a direction perpendicular to the Z-X plane (Y-axis direction), and FIG. 2C is a view of the multilayer capacitor 10 as seen in a direction perpendicular to the Z-Y plane (X-axis direction).

In the pair of external electrodes 3, the ridge portion 6a lies between the first principal face extending portion 3c and each of the first end face portion 3e and the second end face portion 3f, and, a ridge portion 6b lies between the second principal face extending portion 3d and each of the first end face portion 3e and the second end face portion 3f. As shown in FIGS. 1A, 1B and 2A to 2C, the intermetallic compound layer 5c is exposed from the second metallic layer 5b at the ridge portion 6a and the ridge portion 6b.

Moreover, in the pair of external electrodes 3, the ridge portion 6c lies between the first principal face extending portion 3c and each of the first side face extending portion 3g and the second side face extending portion 3h, and, a ridge portion 6d lies between the second principal face extending portion 3d and each of the first side face extending portion 3g and the second side face extending portion 3h. As shown in FIGS. 1A, 1B and 2A to 2C, the intermetallic compound layer 5c is exposed from the second metallic layer 5b at the ridge portion 6c and the ridge portion 6d.

Moreover, in the pair of external electrodes 3, a ridge portion 6e lies between the first side face extending portion 3g and each of the first end face portion 3e and the second end face portion 3f, and, a ridge portion 6f lies between the second side face extending portion 3h and each of the first end face portion 3e and the second end face portion 3f. The intermetallic compound layer 5c is exposed from the second metallic layer 5b at the ridge portion 6e and the ridge portion 6f.

In the multilayer capacitor 10, a corner defined by the intersection of three planes of the external electrode 3 is included in any one of the ridge portions 6, and, the intermetallic compound layer 5c is exposed from the second metallic layer 5b at each corner. For example, the intermetallic compound layer 5c is exposed from the second metallic layer 5b at a position (corner) defined by the intersection of the ridge portion 6a, the ridge portion 6c, and the ridge portion 6e. Moreover, in cases where the intermetallic compound layer 5c is not exposed at each of the ridge portion 6e and the ridge portion 6f, the intermetallic compound layer 5c is exposed at a position defined by the intersection of the ridge portion 6a and the ridge portion 6c.

As shown in FIG. 2A, in the multilayer capacitor 10, when viewed in the Z-axis direction, the ridge portion 6e has starting points for a curved surface which extends curvilinearly across the first side face extending portion 3g and the first end face portion 3e, as well as starting points for a curved surface which extends curvilinearly across the first side face extending portion 3g and the second end face portion 3f, in the X-Y plane. Likewise, in the multilayer capacitor 10, when viewed in the Z-axis direction, the ridge portion 6f has starting points for a curved surface which extends curvilinearly across the second side face extending portion 3h and the first end face portion 3e, as well as starting points for a curved surface which extends curvilinearly across the second side face extending portion 3h and the second end face portion 3f, in the X-Y plane. Note that the curvilinearly-extending curved surface is construed as embracing each of the curved or rounded ridge portion 6e and the curved or rounded ridge portion 6f.

Moreover, as shown in FIG. 2B, in the multilayer capacitor 10, when viewed in the Y-axis direction, the ridge portion 6a has starting points for a curved surface which extends curvilinearly across the first principal face extending portion 3c and the first end face portion 3e, as well as starting points for a curved surface which extends curvilinearly across the first principal face extending portion 3c and the second end face portion 3f, in the X-Z plane. Likewise, in the multilayer capacitor 10, when viewed in the Y-axis direction, the ridge portion 6b has starting points for a curved surface which extends curvilinearly across the second principal face extending portion 3d and the first end face portion 3e, as well as starting points for a curved surface which extends curvilinearly across the second principal face extending portion 3d and the second end face portion 3f, in the X-Z plane. Note that the curvilinearly-extending curved surface is construed as embracing each of the curved or rounded ridge portion 6a and the curved or rounded ridge portion 6b.

Moreover, as shown in FIG. 2C, in the multilayer capacitor 10, when viewed in the X-axis direction, the ridge portion 6c has starting points for a curved surface which extends curvilinearly across the first principal face extending portion 3c and the first side face extending portion 3g, as well as starting points for a curved surface which extends curvilinearly across the first principal face extending portion 3c and the second side face extending portion 3h, in the Y-Z plane. Likewise, in the multilayer capacitor 10, when viewed in the X-axis direction, the ridge portion 6d has starting points for a curved surface which extends curvilinearly across the second principal face extending portion 3d and the first side face extending portion 3g, as well as starting points for a curved surface which extends curvilinearly across the second principal face extending portion 3d and the second side face extending portion 3h, in the Y-Z plane. Note that the curvilinearly-extending curved surface is construed as embracing each of the curved or rounded ridge portion 6c and the curved or rounded ridge portion 6d.

As shown in FIGS. 1A, 1B and 2A to 2C, in the pair of external electrodes 3, the second metallic layer 5b is not disposed at each of the ridge portions 6 so that the intermetallic compound layer 5c can be exposed from the second metallic layer 5b at each ridge portion 6.

Figure 3:
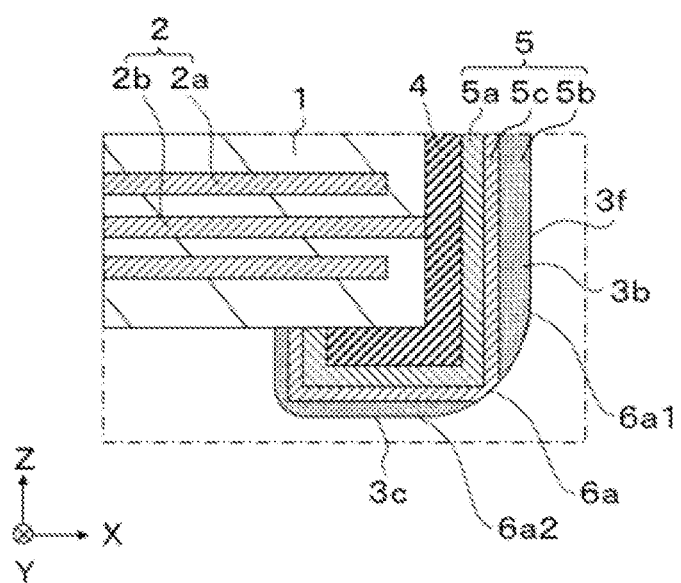
FIG. 3 is an enlarged view of a main part C of the multilayer capacitor shown in FIG. 1B.

For example, in the multilayer capacitor 10 as seen in a side view in the Y-axis direction, as shown in FIG. 3, in the external electrode 3, the ridge portion 6a has a curvilinear form, and, the second metallic layer 5b is not present in a region between a starting point 6a1 and a starting point 6a2 for the curvilinear form so that the intermetallic compound layer 5c can be exposed from the second metallic layer 5b. Likewise, in the multilayer capacitor 10 as seen in a side view in the X-axis direction or the Z-axis direction, in the pair of external electrodes 3, each of the ridge portions 6b to 6f has a curvilinear form, and, the second metallic layer 5b is not present in a region between the two starting points for the curvilinear form so that the intermetallic compound layer 5c can be exposed from the second metallic layer 5b.

In the multilayer capacitor 10, each ridge portion 6 is defined by a curve (curved surface) to suppress occurrence of damage such as chipping. Moreover, in the multilayer capacitor 10, the pair of external electrodes 3 is each composed of the base electrode 4 and the metallic layer 5 (the first metallic layer 5a, the second metallic layer 5b, and the intermetallic compound layer 5c), and, each ridge portion 6 is defined by a curve (curved surface), wherefore a stress is distributed among the ridge portions 6. This helps suppress occurrence of damage such as delamination. For example, in the multilayer capacitor 10, stress distribution among the ridge portions 6 makes it possible to reduce occurrence of, for example, delamination between the base electrode 4 and the first metallic layer 5a. Moreover, in the multilayer capacitor 10, stress distribution among the ridge portions 6 makes it possible to reduce occurrence of, for example, cracking in soldered areas.

In the installation of the multilayer capacitor 10, as shown in FIGS. 4A and 4B, the first external electrode 3a and the substrate electrode 9a are mounted on the substrate 9 via the solder, and, the second external electrode 3b and the substrate electrode 9b are mounted on the substrate 9 via the solder 7. The means for joining the multilayer capacitor 10 and the substrate 9 is not limited to the solder, but may be conductive resin.

As shown in FIGS. 4A and 4B, the first external electrode 3a is soldered, at the second metallic layer 5b constituting the first principal face extending portion 3c, to the substrate electrode 9a via the solder 7. Likewise, the second external electrode 3b is soldered, at the second metallic layer 5b constituting the first principal face extending portion 3c, to the substrate electrode 9b via the solder 7. Consequently, in the multilayer capacitor 10, the lower surfaces of the pair of external electrodes 3 is subjected to the adhesion of solder, and, the second metallic layer 5b constituting the first principal face extending portion 3c and the substrate electrode 9a, as well as the substrate electrode 9b, are soldered to each other.

Thus, as shown in FIGS. 4A and 4B, in the first external electrode 3a, the ridge portion 6a lies between the first end face portion 3e and the first principal face extending portion 3c, and, the second metallic layer 5b is not disposed at the ridge portion 6a, and the intermetallic compound layer 5c is exposed from the second metallic layer 5b. A part of the intermetallic compound layer 5c exposed from the second metallic layer 5b forms a solder adhesion-free part. As the solder 7, for example, use can be made of Sn—Sb solder or Sn—Ag—Cu solder.

This arrangement makes it possible to prevent formation of a solder fillet of the solder 7 in the range from the second metallic layer 5b constituting the first principal face extending portion 3c to the second metallic layer 5b constituting the first end face portion 3e in the first external electrode 3a. That is, in the first external electrode 3a, a part of the intermetallic compound layer 5c exposed at the ridge portion 6a forms an adhesion-free part of the solder 7, and the solder 7 in a molten condition is thus restrained from flowing from the second metallic layer 5b constituting the first principal face extending portion 3c to the second metallic layer 5b constituting the first end face portion 3e, in consequence whereof there results no solder fillet on the first end face portion 3e.

Likewise, as shown in FIGS. 4A and 4B, in the second external electrode 3b, the ridge portion 6a lies between the second end face portion 3f and the first principal face extending portion 3c, and, the second metallic layer 5b is not disposed at the ridge portion 6a, and the intermetallic compound layer 5c is exposed from the second metallic layer 5b. The part of the intermetallic compound layer 5c exposed from the second metallic layer 5b forms a solder adhesion-free part.

Accordingly, this arrangement makes it possible to prevent formation of a solder fillet of the solder 7 in a range from the second metallic layer 5b constituting the first principal face extending portion 3c to the second metallic layer 5b constituting the second end face portion 3f in the second external electrode 3b. That is, in the second external electrode 3b, the part of the intermetallic compound layer 5c exposed at the ridge portion 6a forms an adhesion-free part of the solder 7, and the solder 7 in a molten condition is thus restrained from flowing from the second metallic layer 5b constituting the first principal face extending portion 3c to the second metallic layer 5b constituting the second end face portion 3f, in consequence whereof there results no solder fillet on the second end face portion 3f.

As shown in FIGS. 4A and 4B, in the pair of external electrodes 3, the part of the intermetallic compound layer 5c exposed at the ridge portion 6a forms an adhesion-free part of the solder 7, wherefore a solder fillet of the solder 7 will not be formed on the second metallic layers 5b constituting the first end face portion 3e and the second end face portion 3f, respectively.

As shown in FIGS. 4A and 4B, in the first external electrode 3a and the second external electrode 3b, the ridge portion 6c lies between the first side face extending portion 3g and the first principal face extending portion 3c, as well as between the second side face extending portion 3h and the first principal face extending portion 3c, and, the second metallic layer 5b is not disposed at the ridge portion 6c, and the intermetallic compound layer 5c is exposed from the second metallic layer 5b. The part of the intermetallic compound layer 5c exposed from the second metallic layer 5b forms a solder adhesion-free part.

Accordingly, this arrangement makes it possible to prevent formation of a solder fillet of the solder 7 in the range from the second metallic layer 5b constituting the first principal face extending portion 3c to each of the second metallic layer 5b constituting the first side face extending portion 3g and the second metallic layer 5b constituting the second side face extending portion 3h in the first external electrode 3a and the second external electrode 3b.

That is, in the first external electrode 3a and the second external electrode 3b, a part of the intermetallic compound layer 5c exposed at the ridge portion 6c forms an adhesion-free part of the solder 7, and the solder 7 in a molten condition is thus restrained from flowing from the second metallic layer 5b constituting the first principal face extending portion 3c to each of the second metallic layer 5b constituting the first side face extending portion 3g and the second metallic layer 5b constituting the second side face extending portion 3h, in consequence whereof there results no solder fillet on each of the first side face extending portion 3g and the second side face extending portion 3h.

Thus, as shown in FIGS. 4A and 4B, in the pair of external electrodes 3, the part of the intermetallic compound layer 5c exposed at the ridge portion 6c forms an adhesion-free part of the solder 7, wherefore a solder fillet of the solder 7 will not be formed on the second metallic layers 5b constituting the first side face extending portion 3g and the second side face extending portion 3h, respectively.

Moreover, the ridge portion 6e lies between the first side face extending portion 3g and the first end face portion 3e, as well as between the first side face extending portion 3g and the second end face portion 3f, and, at the ridge portion 6e at which the second metallic layer 5b is not disposed, the intermetallic compound layer 5c is exposed from the second metallic layer 5b, wherefore a solder fillet of the solder 7 will not formed on the ridge portion 6e. Moreover, the ridge portion 6f lies between the second side face extending portion 3h and the first end face portion 3e, as well as between the second side face extending portion 3h and the second end face portion 3f, and, at the ridge portion 6f at which the second metallic layer 5b is not disposed, the intermetallic compound layer 5c is exposed from the second metallic layer 5b, wherefore a solder fillet of the solder 7 will not formed on the ridge portion 6f.

In addition, in the pair of external electrodes 3, the second metallic layer 5b may be disposed so that the intermetallic compound layer 5c is not exposed from the second metallic layer 5b at the ridge portion 6e and the ridge portion 6f.

Moreover, in the pair of external electrodes 3, the ridge portion 6b lies between the first end face portion 3e and the second principal face extending portion 3d, as well as between the second end face portion 3f and the second principal face extending portion 3d, and, the second metallic layer 5b is not disposed at the ridge portion 6b, and the intermetallic compound layer 5c is exposed from the second metallic layer 5b. The part of the intermetallic compound layer 5c exposed from the second metallic layer 5b forms a solder adhesion-free part. In the pair of external electrodes 3, the ridge portion 6d lies between the first side face extending portion 3g and the second principal face extending portion 3d, as well as between the second side face extending portion 3h and the second principal face extending portion 3d, and, the second metallic layer 5b is not disposed at the ridge portion 6d, and the intermetallic compound layer 5c of the metallic layer 5 is exposed from the second metallic layer 5b. The part of the intermetallic compound layer 5c exposed from the second metallic layer 5b forms a soler adhesion-free part.

Thus, in the pair of external electrodes 3, the intermetallic compound layer 5c is exposed from the second metallic layer 5b, and the ridge portions 6a to 6f each form solder adhesion-free parts. Consequently, the multilayer capacitor 10 can be mounted, regardless of its orientation, on the substrate 9.

The multilayer capacitor 10 may be placed, with its first principal face extending portions 3c disposed so as to be opposed to the substrate electrode 9a and the substrate electrode 9b, respectively, so that the first principal face extending portions 3c can be joined to the substrate electrode 9a and the substrate electrode 9b, respectively, via the conductive joining material. In addition, the multilayer capacitor 10 may be placed, with its second principal face extending portions 3d disposed so as to be opposed to the substrate electrode 9a and the substrate electrode 9b, respectively, so that the second principal face extending portions 3d can be joined to the substrate electrode 9a and the substrate electrode 9b, respectively, via the conductive joining material.

Moreover, the multilayer capacitor 10 may be placed, with its first side face extending portions 3g disposed so as to be opposed to the substrate electrode 9a and the substrate electrode 9b, respectively, so that the first side face extending portions 3g can be joined to the substrate electrode 9a and the substrate electrode 9b, respectively, via the conductive joining material. The multilayer capacitor 10 may also be placed, with its second side face extending portions 3h disposed so as to be opposed to the substrate electrode 9a and the substrate electrode 9b, respectively, so that the second side face extending portions 3h can be joined to the substrate electrode 9a and the substrate electrode 9b, respectively, via the conductive joining material.

As described heretofore, in the multilayer capacitor 10, each of the pair of external electrodes 3 is soldered, only at its second metallic layer 5b constituting the first principal face extending portion 3c, to the corresponding one of the substrate electrode 9a and the substrate electrode 9b.

For example, in a multilayer capacitor comprising dielectric layers composed predominantly of, for example, barium titanate, when an AC voltage is applied to the multilayer capacitor, distortion occurs in the dielectric layers due to the electrostrictive effect in accordance with the magnitude of the AC voltage. The distortion causes the multilayer capacitor in itself to vibrate, and, this vibration is transmitted to the substrate 9 with consequent occurrence of vibration in the substrate 9. When the frequency of this vibration falls in the audible frequency range, then the vibration of the substrate 9 appears as vibration sound.

In this regard, in the multilayer capacitor 10 according to this embodiment, the intermetallic compound layer 5c is exposed from the second metallic layer 5b at the ridge portion 6a and the ridge portion 6c, wherefore each of the pair of external electrodes 3 is soldered, at its second metallic layer 5b constituting the first principal face extending portion 3c, to the corresponding one of the substrate electrode 9a and the substrate electrode 9b. Meanwhile, a solder fillet of the solder 7 is not formed on each of the first end face portion 3e, the second end face portion 3f, the first side face extending portion 3g, and the second side face extending portion 3h.

Thus, in the multilayer capacitor 10, since a solder fillet is not formed on each of the first end face portion 3e, the second end face portion 3f, the first side face extending portion 3g, and the second side face extending portion 3h, transmission of vibration through the solder fillet is suppressed. The vibration of the multilayer capacitor 10 caused by the distortion developed therein is hard to be transmitted to the substrate 9, wherefore it is possible to suppress generation of vibration sound in the substrate 9. Consequently, in the multilayer capacitor 10, transmission of vibration to the substrate 9 is suppressed, acoustic noise is less prone to occur, and the vibration sound-suppression effect can be enhanced.

That is, although the multilayer capacitor 10 tends to expand or contract greatly at the central areas of, respectively, the first end face portion 3e and the second end face portion 3f under application of an AC voltage, since a solder fillet of the solder 7 is not formed on the second metallic layers 5b of, respectively, the first end face portion 3e and the second end face portion 3f that undergo expansion and contraction to a greater extent in the multilayer capacitor 10, it is possible to suppress transmission of vibration to the substrate more effectively. Furthermore, although the multilayer capacitor 10 tends to expand or contract also at the first side face extending portion 3g and the second side face extending portion 3h, since a solder fillet of the solder 7 is not formed on each of the second metallic layers 5b of, respectively, the first side face extending portion 3g and the second side face extending portion 3h, it is possible to suppress transmission of vibration to the substrate still more effectively.

Moreover, in the multilayer capacitor 10, the intermetallic compound layer 5c is exposed from the second metallic layer 5b at the ridge portions 6, and, the part of the intermetallic compound layer 5c exposed from the second metallic layer 5b forms a solder adhesion-free part, and the solder adhesion-free part restrains the flow of the solder 7.

Accordingly, a solder fillet of the solder 7 is not formed on the end face portions and the side face extending portions, regardless of the size of each of the substrate electrode 9a and the substrate electrode 9b.

Furthermore, in a multilayer capacitor, if a solder fillet is formed on its end face portion and side face extending portion, there arises a difference in soldering-induced tension between pair of external electrodes 3 which are opposed to each other, thus causing a so-called tombstone phenomenon in which the multilayer capacitor stands up vertically. In this regard, in the multilayer capacitor 10, in the pair of external electrodes 3, a solder fillet of the solder 7 is not formed on each of the first end face portion 3e, the first side face extending portion 3g, and the second side face extending portion 3h, as well as on each of the second end face portion 3f, the first side face extending portion 3g, and the second side face extending portion 3h. This makes it possible to suppress the tombstone phenomenon.

The following describes an example of methods for manufacturing the multilayer capacitor 10 shown in FIGS. 1A and 1B.

There are prepared a plurality of first and second ceramic green sheets for forming the dielectric layers. The first ceramic green sheet constitutes the first internal electrode 2a, and the second ceramic green sheet constitutes the second internal electrode 2b.

To form the first internal electrodes 2a, the plurality of first ceramic green sheets are each prepared by forming a first-internal-electrode 2a conductor paste layer on a ceramic green sheet with use of a conductor paste for forming the first internal electrode 2a. In forming the first ceramic green sheets, to obtain numbers of the multilayer capacitors 10, the plurality of first internal electrodes 2a are formed in a single ceramic green sheet.

Moreover, to form the second internal electrodes 2b, the plurality of second ceramic green sheets are each prepared by forming a second-internal-electrode 2b conductor paste layer on a ceramic green sheet with use of a conductor paste for forming the second internal electrode 2b. In forming the second ceramic green sheets, to obtain numbers of the multilayer capacitors 10, the plurality of second internal electrodes 2b are formed in a single ceramic green sheet.

For example, each of the first-internal-electrode conductor paste layer and the second-internal-electrode conductor paste layer as described above is formed by printing the corresponding conductor paste in a predetermined pattern onto the ceramic green sheet by means of screen printing or otherwise.

The ceramic green sheet for forming the dielectric layer is made of a material composed predominantly of dielectric ceramics such for example as barium titanate ($BaTiO_3$), calcium titanate ($CaTiO_3$), strontium titanate ($SrTiO_3$), or calcium zirconate ($CaZrO_3$), or, alternatively, may be made of the above-described material with, for example, a Mn compound, a Fe compound, a Cr compound, a Co compound, or a Ni compound added as a secondary constituent.

The first and second ceramic green sheets are obtained by admixing a suitable organic solvent or the like in raw powder of a dielectric ceramic material and an organic binder to prepare a ceramic slurry, and subsequently molding the ceramic slurry by a doctor blade technique or other means.

The first internal electrode 2a-forming conductor paste and the second internal electrode 2b-forming conductor paste are each prepared by adding an additive (dielectric material), a binder, a solvent, a dispersant, and so forth to powder of the above-described conductor material for each internal electrode (metal material), and subsequently kneading the resultant. Examples of conductive materials used for the first internal electrode 2a and the second internal electrode 2b include a metal material such as nickel (Ni), copper (Cu), silver (Ag), palladium (Pd), or gold (Au), and an alloy material containing one or more of the above-described metal materials, such as a Ag—Pd alloy. It is preferable that the first internal electrode 2a and the second internal electrode 2b are made of the same metal or alloy material.

A ceramic material-made laminated body is produced by alternately laminating the plurality of first and second ceramic green sheets and laminating an internal electrode 2-free ceramic green sheet on each of the outermost layers of the lamination in the stacking direction.

In this way, the laminated body composed of the plurality of first and second ceramic green sheets is integrated by press process, thereby forming a green stacked body of large size including numbers of green stacked bodies. This large-size green laminated body is cut up to obtain separate green stacked bodies, each constituting the stacked body 1 of the multilayer capacitor 10 as shown in FIGS. 1A and 1B. For example, a dicing blade may be used to cut up the large-size green laminated body.

The stacked body 1 may be obtained by firing the green laminated body at a temperature of 800 (° C.) to 1300 (° C.), for example. In this process, the plurality of first and second ceramic green sheets become the dielectric layers, the first-internal-electrode conductor paste layer becomes the first internal electrode 2a, and the second-internal-electrode conductor paste layer becomes the second internal electrode 2b. Moreover, the stacked body 1 may have its corners or sides rounded off by grinding means such for example as barrel finishing. The stacked body 1 having rounded corners or rounded sides is resistant to chipping at its corners or sides.

Next, the pair of external electrodes 3, each comprising the base electrode 4 and the metallic layer 5, is formed on the stacked body 1.

First, the base electrode 4 of each of the pair of external electrodes 3 is formed by applying a conductor paste for forming the base electrode 4 of the external electrode 3 on each of the first end face 1c and the second end face 1d of the stacked body 1, and subsequently baking the pastes out.

Moreover, the base electrode 4-forming conductor paste is prepared by adding a binder, a solvent, a dispersant, and so forth to powder of the metal material constituting the base electrode 4, and subsequently kneading the resultant. Examples of conductive materials used for the base electrode 4 include a metal material such as copper (Cu), nickel (Ni), silver (Ag), palladium (Pd), or gold (Au), and an alloy material containing one or more of the above-described metal materials, such as a Cu—Ni alloy. Further, instead of the conductor-paste baking technique, a thin-film forming technique, such as vapor deposition, plating, or sputtering, may be adopted as the method of forming the base electrode 4.

Next, the first metallic layer 5a is disposed on the surface of the base electrode 4 so as to cover the base electrode 4. For example, the first metallic layer 5a is formed on the surface of the base electrode 4 by means of electrolytic plating or otherwise. Moreover, the first metallic layer 5a is, for example, a nickel (Ni)-plating layer, a copper (Cu)-plating layer, a gold (Au)-plating layer, a silver (Ag)-plating layer, or a tin (Sn)-plating layer.

Then, the second metallic layer 5b is disposed on the surface of the first metallic layer 5a so as to cover the first metallic layer 5a. For example, the second metallic layer 5b is formed on the surface of the first metallic layer 5a by means of electrolytic plating or otherwise. Moreover, the second metallic layer 5b is, for example, a nickel (Ni)-plating layer, a copper (Cu)-plating layer, a gold (Au)-plating layer, a silver (Ag)-plating layer, or a tin (Sn)-plating layer.

In the multilayer capacitor 10, for example, the first metallic layer 5a is formed of a nickel (Ni)-plating layer, and the second metallic layer 5b is formed of a tin (Sn)-plating layer, and the tin (Sn)-plating layer constituting the second metallic layer 5b is disposed so as to cover the nickel (Ni)-plating layer constituting the first metallic layer 5a. At the time of this process step, the second metallic layer 5b lies over the entire surface of the first metallic layer 5a. That is, the intermetallic compound layer 5c is not yet exposed from the second metallic layer 5b in the ridge portion 6.

By disposing the first metallic layer 5a and the second metallic layer 5b on the surface of the base electrode 4, and as described earlier, for example, performing a heating process under conditions of 250 (° C.) to 260 (° C.), and time of heating at temperature exceeding 230 (° C.) which is eutectic temperature of 60 (sec) to 90 (sec), the intermetallic compound layer 5c is formed between the first metallic layer 5a and the second metallic layer 5b. In the case where the first metallic layer 5a is a nickel (Ni)-plating layer and the second metallic layer 5b is a tin (Sn)-plating layer, a $Ni_3Sn_4$ is formed as the intermetallic compound layer 5c between the first metallic layer 5a and the second metallic layer 5b.

Next, the intermetallic compound layer 5c is exposed in each of the ridge portions 6 in the pair of external electrodes 3. For example, it is possible to expose the intermetallic compound layer 5c lying under the second metallic layer 5b by grinding parts of the second metallic layer 5b which correspond to the ridge portions 6 (corners and sides) by grinding means such as barrel finishing. With the use of the grinding means, the parts of the second metallic layer 5b which correspond to the ridge portions 6 are removed, wherefore the intermetallic compound layer 5c can be exposed from the second metallic layer 5b.

Thus, in the first external electrode 3a and the second external electrode 3b, the intermetallic compound layer 5c can be exposed from the second metallic layer 5b in the ridge portions 6a to 6f. Moreover, in the first external electrode 3a and the second external electrode 3b, the intermetallic compound layer 5c is exposed at each of the ridge portions 6, and, each ridge portion 6 has a curved surface.

It should be understood that the invention is not limited to the embodiment thus far described, and that various changes, modifications, and improvements are possible without departing from the scope of the invention.

For example, although the embodiment has been described with respect to the case for the multilayer capacitor 10 of general type, the invention is not so limited, but may be applicable to a so-called three-terminal multilayer capacitor having three external electrodes. That is, also in the three-terminal multilayer capacitor, the vibration sound-suppression effect can be enhanced by forming the solder adhesion-free part at the ridges of external electrodes by utilizing the technologies according to the invention.

REFERENCE SIGNS LIST

1: Stacked body
1a: First principal face
1b: Second principal face
1c: First end face
1d: Second end face
1e: First side face
1f: Second side face
2: Internal electrode
2a: First internal electrode
2b: Second internal electrode
3: External electrode
3a: First external electrode
3b: Second external electrode
3c: First principal face extending portion
3d: Second principal face extending portion
3e: First end face portion
3f: Second end face portion
3g: First side face extending portion
3h: Second side face extending portion
4: Base electrode
5: Metallic layer
5a: First metallic layer
5b: Second metallic layer
5c: Intermetallic compound layer
6: Ridge portion
7: Solder
9: Substrate
9a, 9b: Substrate electrode
10: Multilayer capacitor

The invention claimed is:

1. A multilayer capacitor, comprising:
a stacked body in which a plurality of dielectric layers are laminated, the stacked body having a form of a rectangular parallelepiped having a pair of principal faces, a pair of end faces, and a pair of side faces;
a plurality of internal electrodes which are disposed between the plurality of dielectric layers so as to be spaced from each other in a stacking direction of the plurality of dielectric layers; and
a pair of external electrodes which are disposed on the pair of end faces, respectively, and are electrically connected to different internal electrodes of the plurality of the internal electrodes, respectively,
the pair of external electrodes each comprising an end face portion which covers corresponding one of the pair of end faces; a first principal face extending portion which extends from the end face portion to a first principal face of the pair of principal faces; a second principal face extending portion which extends from the end face portion to a second principal face of the pair of principal faces; a first side face extending portion which extends from the end face portion to a first side face of the pair of side faces; and a second side face extending portion which extends from the end face portion to a second side face of the pair of side faces,
each of the pair of external electrodes comprising a base electrode and a metallic layer which covers the base electrode,
the metallic layer comprising a first metallic layer covering the base electrode and a second metallic layer located outside the first metallic layer,
each of the pair of external electrodes further comprising an intermetallic compound layer which is located outside the first metallic layer, contains a metal which is a same as that contained in the first metallic layer and a metal which is a same as that contained in the second metallic layer, and is exposed from the second metallic layer in a ridge portion lying between the end face portion and the first principal face extending portion, a ridge portion lying between the first side face extending portion and the first principal face extending portion, and a ridge portion lying between the second side face extending portion and the first principal face extending portion.

2. The multilayer capacitor according to claim 1, wherein the intermetallic compound layer is also exposed from the second metallic layer in a ridge portion lying between the end face portion and the second principal face extending portion, a ridge portion lying between the first side face extending portion and the second principal face extending portion, and a ridge portion lying between the second side face extending portion and the second principal face extending portion in each of the pair of external electrodes.

3. The multilayer capacitor according to claim 1, wherein the intermetallic compound layer is also exposed from the second metallic layer in a ridge portion lying between the end face portion and the first side face extending portion and a ridge portion lying between the end face portion and the second side face extending portion in each of the pair of external electrodes.

4. A mounting structure, comprising:
the multilayer capacitor according to claim 1; and
a substrate having a substrate electrode for mounting of the multilayer capacitor,
the multilayer capacitor and the substrate being disposed so that the first principal face extending portion and the substrate electrode are opposed to each other,
the first principal face extending portion and the substrate electrode being joined to each other via a conductive joining material.

5. A mounting structure, comprising:
the multilayer capacitor according to claim 2; and
a substrate having a substrate electrode for mounting of the multilayer capacitor,
the multilayer capacitor and the substrate being disposed so that the first principal face extending portion or the second principal face extending portion and the substrate electrode are opposed to each other,
the first principal face extending portion or the second principal face extending portion and the substrate electrode being joined to each other via a conductive joining material.

6. A mounting structure, comprising:
the multilayer capacitor according to claim 3; and
a substrate having a substrate electrode for mounting of the multilayer capacitor,
the multilayer and the substrate being disposed so that the first principal face extending portion or the second principal face extending portion and the substrate electrode are opposed to each other,
the first principal face extending portion or the second principal face extending portion and the substrate electrode being joined to each other via a conductive joining material.

7. A mounting structure, comprising:
the multilayer capacitor according to claim 3; and
a substrate having a substrate electrode for mounting of the multilayer capacitor,
the multilayer capacitor and the substrate being disposed so that the first side face extending portion or the second side face extending portion and the substrate electrode are opposed to each other,
the first side face extending portion or the second side face extending portion and the substrate electrode being joined to each other via a conductive joining material.

8. A mounting structure, comprising:
the multilayer capacitor according to claim 3; and
a substrate having a substrate electrode for mounting of the multilayer capacitor,
the multilayer capacitor and the substrate being disposed so that the end face portion and the substrate are opposed to each other,
the end face portion and the substrate electrode being joined to each other via a conductive joining material.

9. The multilayer capacitor according to claim 1, wherein the intermetallic compound layer is also exposed from the second metallic layer in a ridge portion lying between the end face portion and the first side face extending portion and a ridge portion lying between the end face portion and the second side face extending portion in each of the pair of external electrodes.

* * * * *